United States Patent

[11] 3,580,164

| [72] | Inventor | Edward D. Baker |
| | | Belmont, Calif. |
| [21] | Appl. No. | 865,102 |
| [22] | Filed | Oct. 9, 1969 |
| [45] | Patented | May 25, 1971 |
| [73] | Assignee | National Industrial Manufacturing |

[54] HAMBURGER COOKING MACHINE
10 Claims, 11 Drawing Figs.

[52] U.S. Cl. ................................................. 99/339,
99/386, 99/390, 99/391, 99/400, 99/443, 99/446
[51] Int. Cl. .................................................... A47j 37/00
[50] Field of Search ............................................. 126/41 (C);
99/339, 386, 387, 389, 390, 391, 393, 443, 446, 400

[56] References Cited
UNITED STATES PATENTS

| 1,458,021 | 6/1923 | Bamford | 99/386X |
| 1,696,613 | 12/1928 | Shroyer | 99/386 |
| 2,253,027 | 8/1941 | Hall | (99/387UX) |
| 2,565,174 | 8/1951 | Fredenhagen et al. | 99/386 |
| 2,718,188 | 9/1955 | Read et al. | 99/386 |
| 3,371,595 | 3/1968 | Peters | 99/386X |
| 3,372,635 | 3/1968 | Meyer | 99/386X |
| 3,448,678 | 6/1969 | Burstein | 99/386 |
| 3,456,578 | 7/1969 | Pinsly | 99/386X |
| 3,460,461 | 8/1969 | Langsam | 99/386 |
| 3,492,938 | 2/1970 | Oxford et al. | 99/339 |

*Primary Examiner*—Billy J. Wilhite
*Attorney*—Lothrop and West

ABSTRACT: A hamburger cooking machine includes a cooking element of the gas-fired, radiant energy, surface combustion type mounted on a frame in conjunction with an openwork chain patty conveyor arranged with both the upper and lower runs of the conveyor directly exposed to the cooking element. Means on the frame advance the conveyor, and a patty thereon, with respect to the cooking element to grill the patty. A bun conveyor is also mounted on the frame and is similarly moved with respect to a comparable source of heat so that a bun thereon is warmed or toasted. The hamburger patty and the bun are simultaneously conveyed through the machine, and are discharged at about the same time for assembly into a hamburger.

INVENTOR
EDWARD D. BAKER
By
Lothrop & West
ATTORNEYS

INVENTOR
EDWARD D. BAKER
BY
Lothrop & West
ATTORNEYS

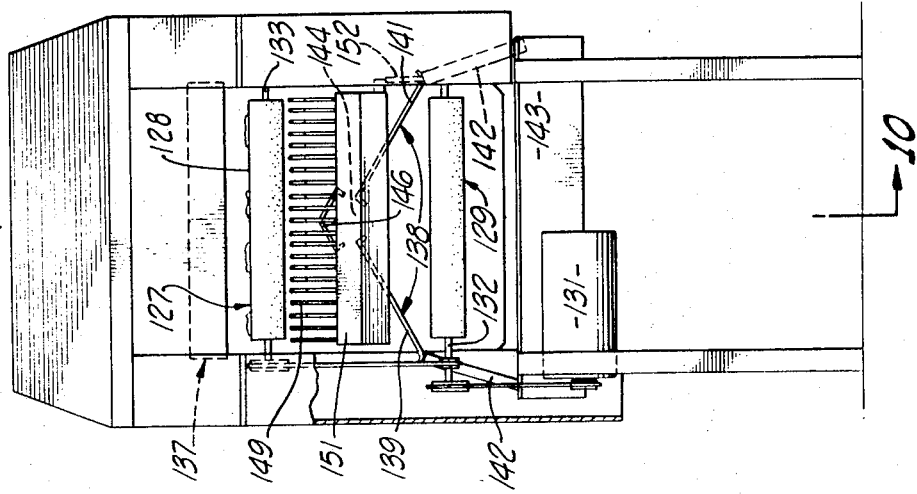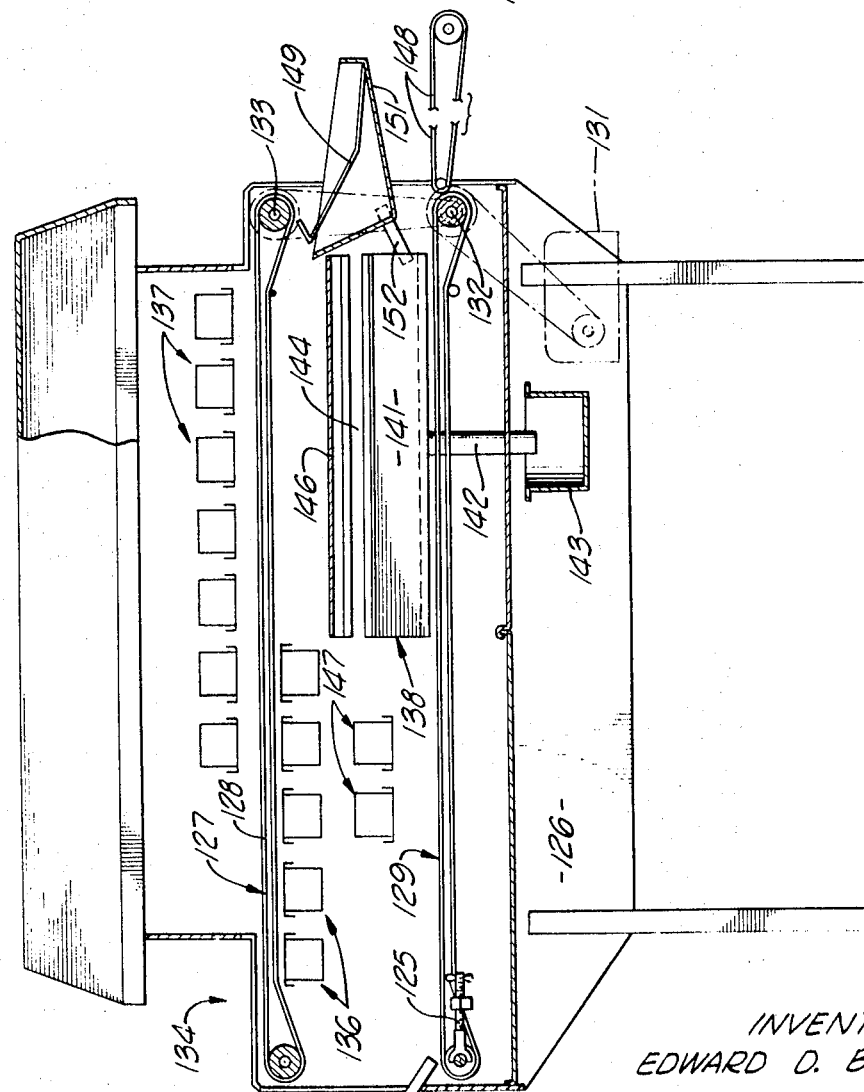

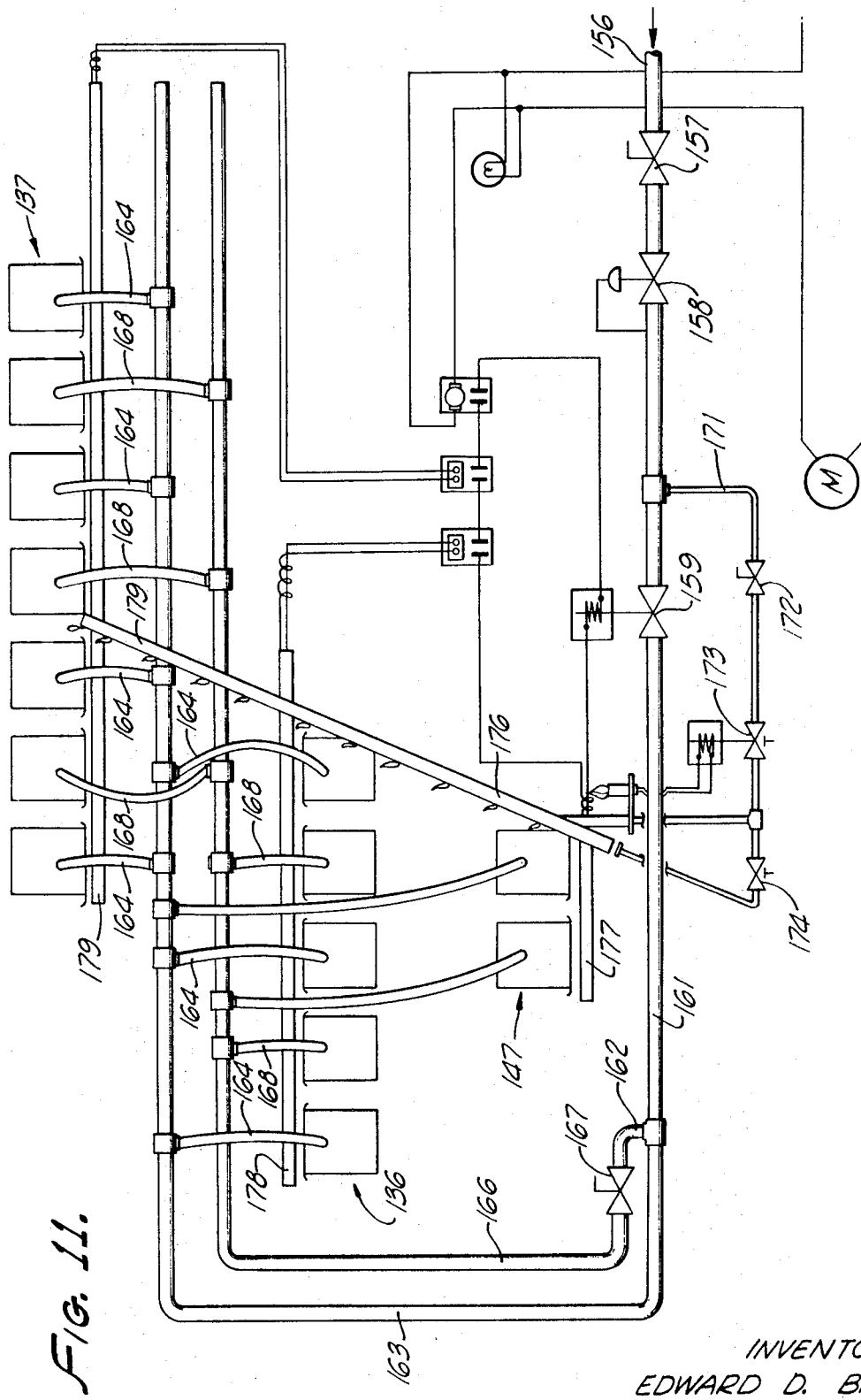

HAMBURGER COOKING MACHINE

One of the most widely consumed items of food is a hamburger, composed of a central patty of ground and cooked meat within an encompassing sliced bun which itself may be heated or toasted. Generally speaking, hamburgers of this sort are individually and manually prepared by a cook who individually cooks the hamburger patty on a cooking surface, usually flat, and who utilizes a suitable bun split into half as an enclosure for the patty. The cook sometimes toasts or heats the bun, usually on the same cooking element on which the hamburger itself is prepared. While this is a satisfactory way of providing the product, it is relatively slow and laborious and is not well suited to the quick supply of a large number of substantially uniform hamburgers.

It is therefore an object of the invention to provide a hamburger cooking machine that can operate with only a small amount of supervision and which is effective to provide a large number of hamburgers complete with uniformly prepared patties and buns.

Another object of the invention is to provide a hamburger cooking machine which when appropriately fed is capable of providing a continuous stream of hamburger patties and buns ready for consumption.

A further object of the invention is to provide a hamburger cooking machine that is readily operable by, and can be cared for by, unskilled people, yet which can easily be maintained in a sanitary and clean condition.

A further object of the invention is to provide a hamburger cooking machine that can readily be serviced and that is effective for installation in various different environments, yet will provide a substantially standard source of cooked hamburgers.

A further object of the invention is to provide a hamburger cooking machine the use of which is generally acceptable and attractive to the ultimate consumers so that the machine furnished product will be well received.

Another object of the invention is to provide a hamburger cooking machine that is generally an improvement over the presently available mechanism for cooking hamburgers.

Other objects of the invention together with the foregoing are described in the accompanying description and are illustrated in the accompanying drawing in which:

FIG. 9 is an end elevation of another modified form of hamburger cooking machine in accordance with the invention;

FIG. 10 is a cross section, the plane of which is indicated by the line 10-10 of FIG. 9; and FIG. 11 is a schematic layout of some of the gas and electric connections.

Figure 1:
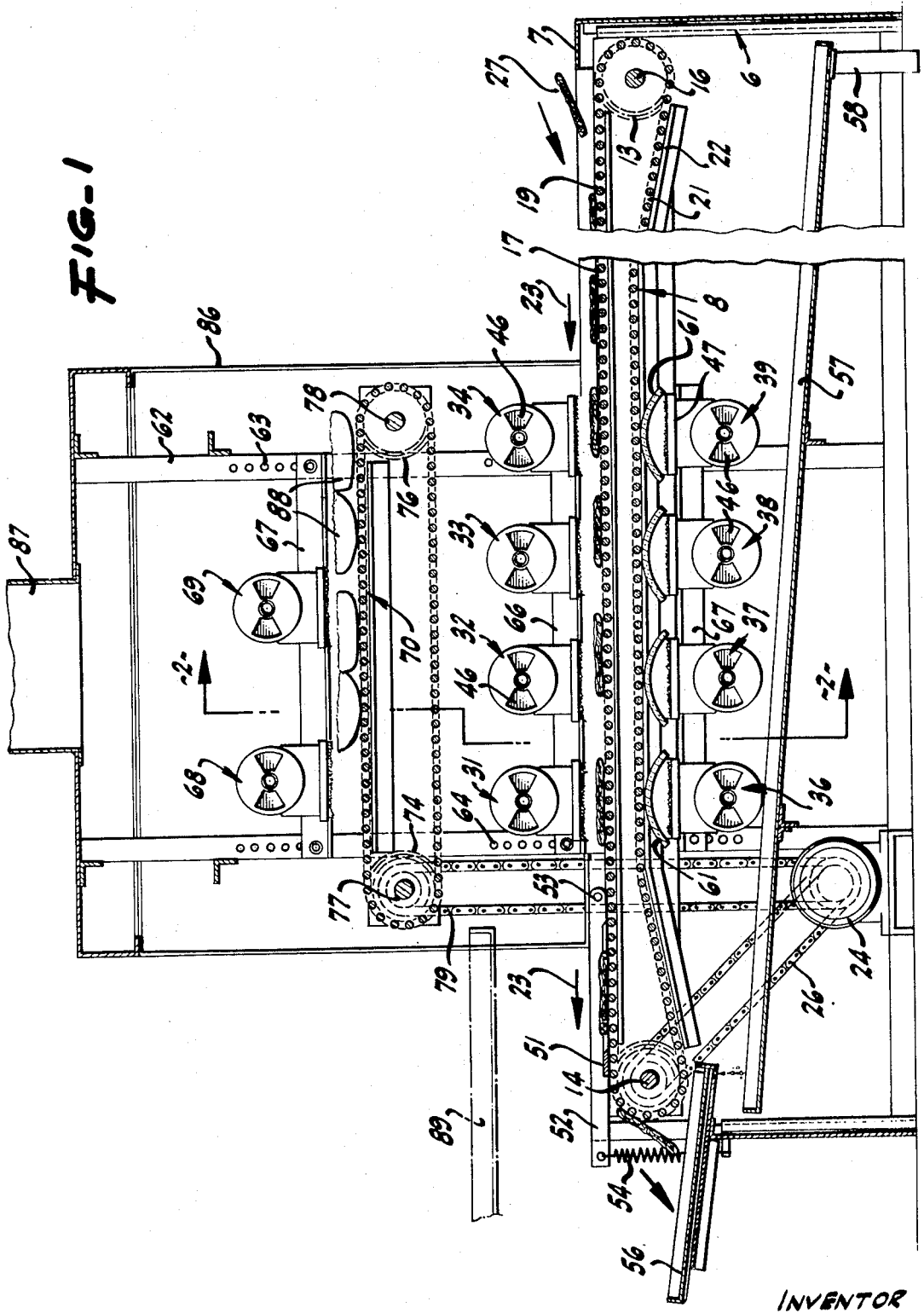
FIG. 1 is a cross section on a vertical longitudinal plane through a hamburger cooking machine constructed pursuant to the invention.

While the hamburger cooking machine of the invention can be embodied in a large number of different ways, it has successfully been incorporated in the forms shown in the accompanying drawings. In the form particularly illustrated in FIG. 1, there is afforded a framework 6 made up of the usual metal shapes and angles designed to rest on the floor or other support so as to provide what in effect is a table 7 at a convenient height, approximately waist height.

Arranged on the frame 6 is a patty conveyor 8. This includes a pair of side chains 9 and 11, of the customary sort, at their opposite ends trained around chain sprockets 12 and 13 on supporting shafts 14 and 16 suitably journaled in the frame 6. The chain conveyors are cross-connected by any suitable form of openwork, flexible band. In this instance the cross connections include a plurality of metal rods or bars 17 approximating the customary form and shape of grill bars, although the openwork conveyor can include a reticulated chain or other flexible structure having sufficient supporting ability to carry a series of hamburger patties and having a number of through openings so that radiant heat can readily pass therethrough and so that grease or drippings or other unwanted materials can pass through the conveyor by gravity.

The patty conveyor 8 is thus arranged in the form of an upper run 19 and a lower run 21 extending substantially parallel to each other with the upper run substantially flat at about table height and with the lower run appropriately supported on guides 22 so that preferably the upper run and the lower run near the central portion of the frame are quite close together.

In order that the conveyor can be driven and so that the upper run can be advanced in the direction of the arrows 23 (FIG. 1,) I provide on the frame 6 an electric motor 24 having a drive chain 26 appropriately driven and engaged with the drive shaft 14. Thus when the motor is energized the upper run 19 of the chain is moved to the left in FIG. 1 and the lower run is returned in the opposite direction.

Pursuant to the invention, the upper run of the chain in the area adjacent the shaft 16 is entirely open in the upward direction so that a user can immediately deposit a number of hamburger patties thereon in any desired pattern. Conveniently, an depending upon the size of the patties, there may be two or more arranged one after the other in the direction of the conveyor advance or arranged side-by-side across the conveyor so that several patties arrive at the central portion of the conveyor simultaneously.

Disposed above the upper run of the conveyor on the frame 6 is a plurality of upper cooking elements 31, 32, 33 and 34. Likewise there is disposed on the frame 6 another group of cooking elements 36, 37, 38 and 39 preferably located immediately below the upper elements and also located below the lower run of the conveyor. While the cooking elements can be of various different sorts, such as open gas flame or electrically heated rods, they are preferably of the type involving surface combustion of gas with very little visible flame but effective to dissipate the generated heat almost entirely by radiation.

Figure 2:
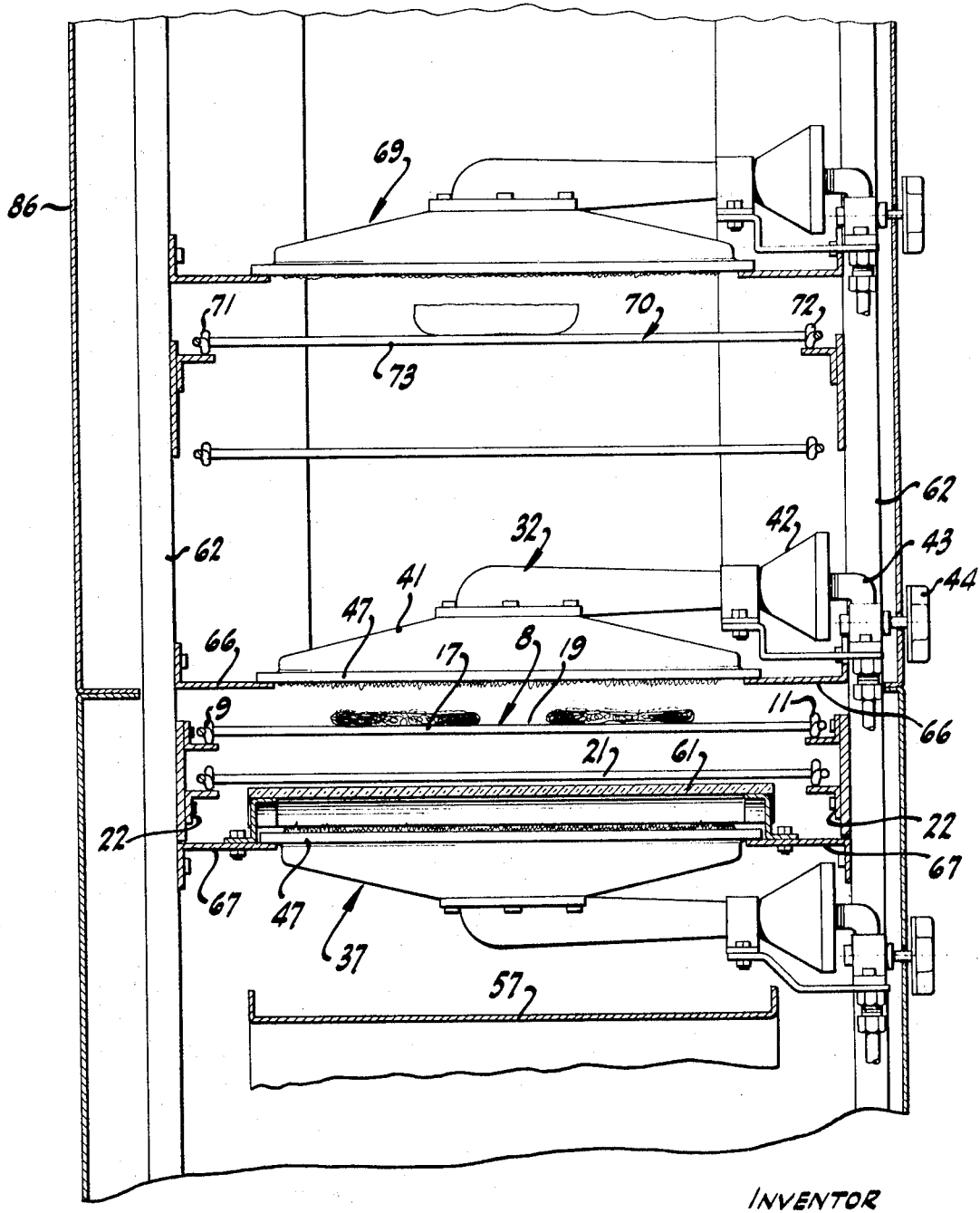
FIG. 2 is a cross section to an enlarged scale of the machine of FIG. 1, the plane of section being indicated by the line 2-2 of FIG. 1.
Figure 3:
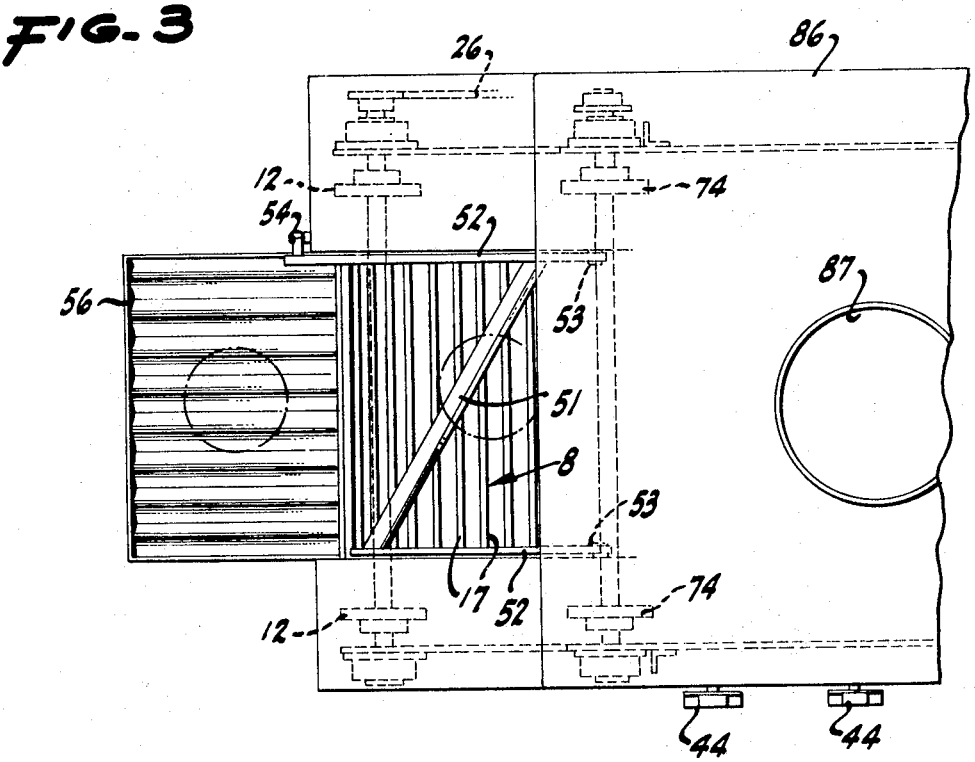
FIG. 3 is a plan of a portion of the discharge end of the machine of FIG. 1.

Each of these elements, as particularly shown in FIG. 2, preferably includes a casing 41 to which a gas venturi tube 42 is secured. The tube 42 receives a supply of gas through an elbow 43 under the control of a hand valve 44 and by its efflux inducing a flow of atmospheric air in the usual fashion through damper openings 46 (FIG. 1) into the interior of the casing 41. The casing on one face is defined by a ceramic plate 47 through which the gas-air mixture can discharge and burn to afford a hot ceramic radiant element. The radiant elements 47 of the burners are substantially coplanar and are in position to radiate onto the upper run as well as the lower run of the patty conveyor. As the patties on the upper run of the conveyor come immediately above the cooking elements, they are subjected to a concentrated radiated heat supply on both the top and the bottom. The speed of advance of the conveyor is such and the amount of heat and number of burners is such that the conveyed patties are substantially cooked during their traverse beneath the cooking elements 31 to 34 inclusive and above the cooking elements 36 to 39 inclusive.

After they have completed their advance between the cooking elements the patties are discharged. Should a patty tend to stick to the crossbars 17 it is separated from the conveyor, as it advances, by an angularly disposed sharp-edged knife 51 on a swing frame 52 connected by a cross-shaft 53 to the main frame 6 and normally urged downwardly against the bars of the conveyor by springs 54. The action of the knife 51 is to separate any stuck patties from the conveyor. The patties are then discharged as the conveyor rounds the ends of its path onto a tray 56. If an operator is in attendance, the patty or patties can be lifted from the conveyor just before the conveyor rounds the end construction since the conveyor is unobstructed at the top in this area. The patties at this point have been cooked on both sides by radiant heat from above and from below and are available to be inserted into hamburger buns.

The returning, lower run of the conveyor is freed of patties and returns to the loading area. During the return whatever material may have adhered to the conveyor bars tends to drop off onto an inclined drip pan 57 disposed below the conveyor on the frame 6 and inclined downwardly toward a drain pipe 58. Any materials falling from the upper run of the conveyor likewise are received by and conveyed away by the same drip pan.

For additional sanitation the lower run bars with any adhering material then pass directly over and in close proximity to the lower group of cooking elements 36, 37, 38 and 39. Not only are any adhering materials cooked and carbonized to fall by gravity, but slight operating vibration of the chain works to the same purpose. The returning bars are substantially heated, so that they return to the upper run at a high temperature. When raw hamburger patties are subsequently placed thereon, the patties are immediately seared with a highly desirable pattern of transverse grid lines simulating the char lines on a grilled steak.

The residual materials falling from the return run of the conveyor or from the upper run might possibly interfere with clean combustion from the lower group of burners. For that reason each of the lower burners is provided with a generally arcuate protecting shield 61, preferably of glass. The glass shields permit a view of the glowing ceramic and are readily cleaned when necessary, yet act as diverting barriers for any falling material so that the lower group of burners is kept quite clean.

In this fashion there is always provided a heat-cleaned bar conveyor at a high temperature for the continuous reception of hamburger patties to be cooked, the patties themselves being subjected to a cooking operation by radiant heat from both sides and being subjected to a cooking operation by radiant heat from both sides and being finally automatically discharged for further use.

Additionally, there is afforded a means for heating or toasting the buns for use with the patties. On the frame 6 there is a superstructure 62 comprised of uprights having a number of apertures 63 therein very much like the apertures 64 supporting the subframes 66 and 67 on which the burner groups are mounted. In this fashion positioning mechanism is provided so that the lower groups of burners can be properly spaced as desired with respect to the patty conveyor and so that upper burners 68 and 69 can be appropriately spaced with regard to a bun conveyor 70. The latter conveyor is very much like the conveyor 8 and includes a pair of side chains 71 and 72 connecting by openwork crossbars 73 and trained around sprockets 74 and 76 on cross-shafts 77 and 78 appropriately journaled on the superstructure. The bun conveyor is driven from the motor 24 by a drive chain 79, so that the upper run 81 of the bun conveyor operates to advance in the same direction as the upper run of the patty conveyor and usually at a comparable speed.

The superstructure and much of the conveyor mechanism is at least partially enclosed in a housing 86 open at its opposite ends but closed on its opposite sides and at its top leading to a flue 87 to carry away any products of combustion that might be deleterious. The bun conveyor is effective to receive split buns 88 at a feeding end and to carry them beneath the cooking elements 68 and 69 so that they are heated or toasted. The buns, if not previously manually removed, are discharged at the left of far end of the bun conveyor either immediately onto the lower patty conveyor or onto an intermediate shelf 89 (shown in dotted lines in FIG. 1) where they repose until the user assembles them with the subjacent cooked patties.

There is thus provided a mechanism for continually cooking patties and heating buns so that they can be assembled at one end of the machine in a continuous fashion for consumption.

Figure 4:
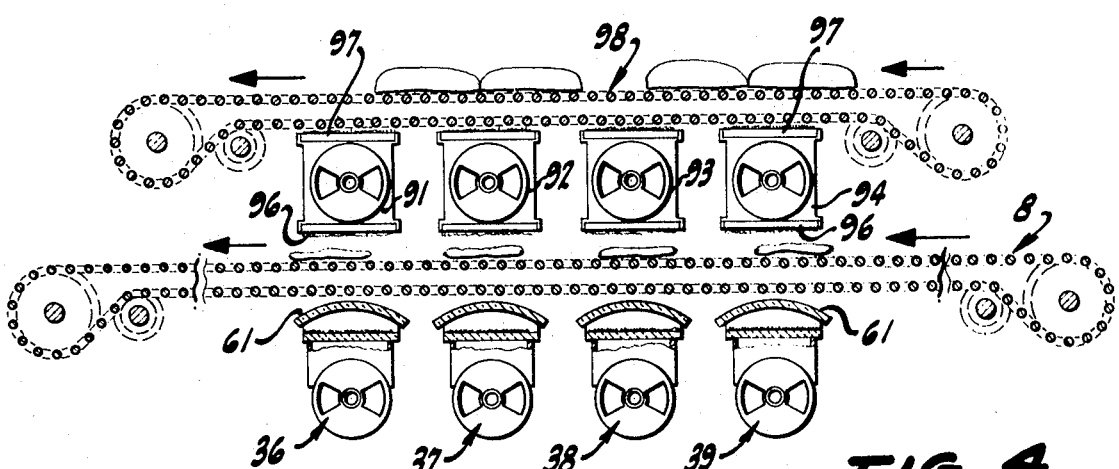
FIG. 4 is a cross section on a vertical longitudinal plane, somewhat similar to FIG. 1, showing a modified form of hamburger cooking machine pursuant to the invention, parts being omitted for clarity.
Figure 5:
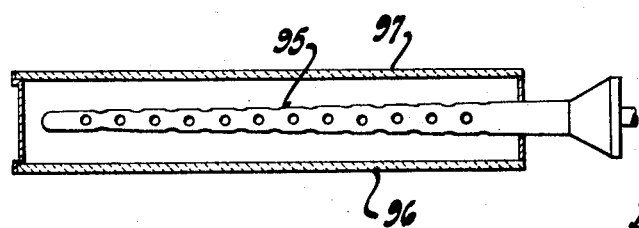
FIG. 5 is a cross section along the axis of a duplex cooking element.

As a modification, there is shown in FIG. 4 a quite comparable arrangement in which, however, the number of burners is reduced. In this instance the lower burners 36 to 39 are exactly as before, but the upper burners 31 to 34 are replaced by duplex burners 91 to 94 having a central gas distributor 95 and having ceramic radiant surfaces 96 comparable to the ceramic plates 47 but also having upper ceramic plates 97 of a similar nature. When approximately supplied and operating the cooking elements are radiant both on their nether surfaces and on their upper surfaces. Advantage of this is taken to reduce the height of the machine by eliminating the cooking elements 68 and 69 and instead passing the bun conveyor 98 over the upper surfaces 97 while the lower surfaces 96 are acting upon the patties on the lower patty conveyor.

Figure 6:
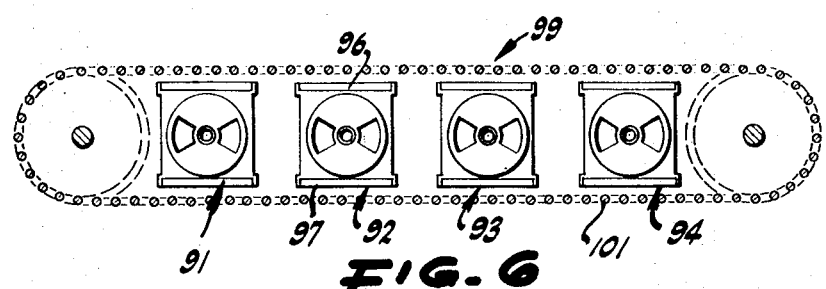
FIG. 6 is a detailed view, somewhat like FIG. 4, but showing a further modified form of conveyor and cooking element for the hamburger cooking machine.

In a comparable fashion, there is a further modification as shown in FIG. 6 in which the duplex burners 91 and 94 are utilized, but instead of having both runs of the bun conveyor travel over the tops of the duplex burners, the bun conveyor 99 has its upper run above the cooking elements, whereas its lower run 101 passes beneath the elements. In either instance the conveyor bars are always kept quite hot so that the immediate contact of either the bun or the patty is such as to provide an initial, patterned searing of the adjacent surface of the food and so that the heat keeps the bars relatively clean and available for repeated use by successive buns and successive patties.

Figure 8:
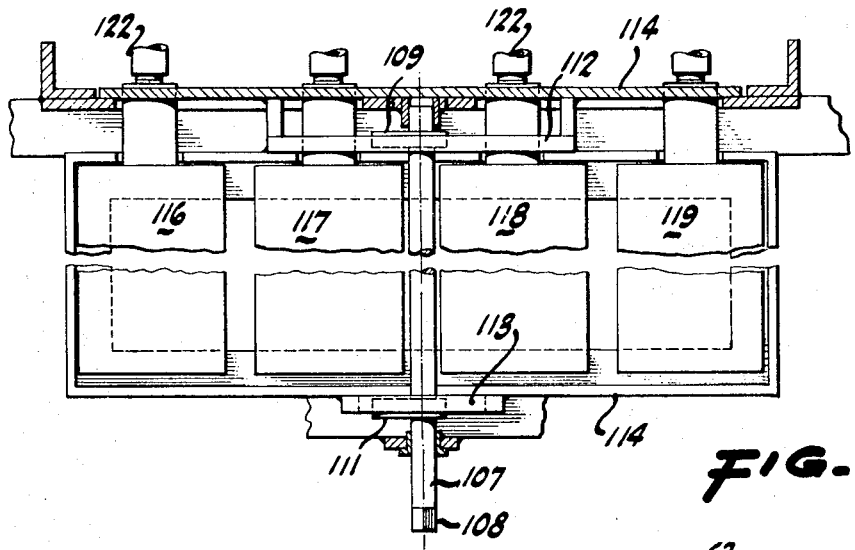
FIG. 8 is a side elevation of the machine shown in FIG. 7.
Figure 7:
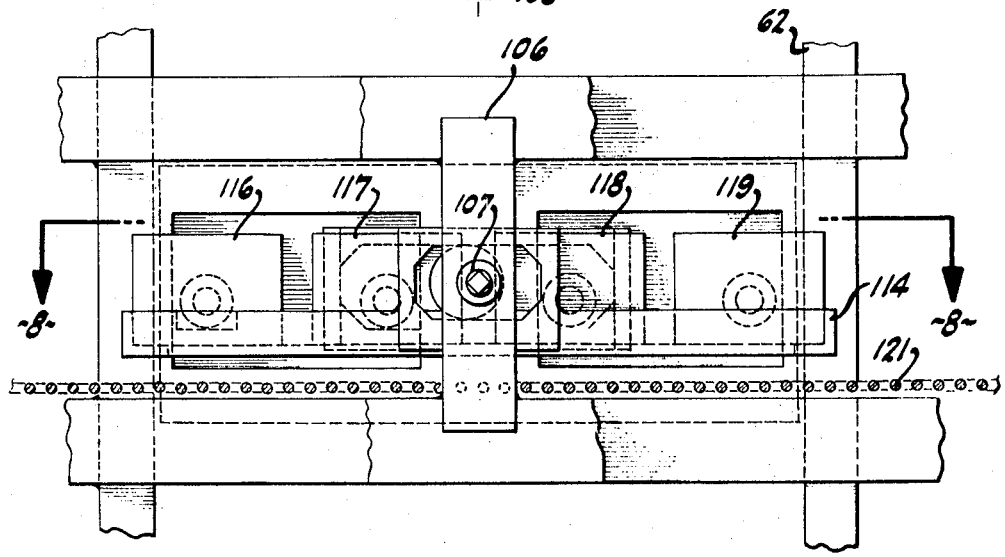
FIG. 7 is a plan of a portion of an adjustable hamburger cooking machine, parts being shown in cross section on the line 7-7 of FIG. 8.

Under some conditions the product of the radiant cooking operation does not have the desired brownish color but, even though thoroughly cooked, is grayish in color. This is sometimes not acceptable to the consumer. It has been found that the desired brownish color can be attained provided the food or patty is disposed very close to the burner unit. Though they are often nearly invisible, there are low flames adjacent the radiant surface and if they are close enough to the food they will brown it. The positioning is somewhat critical so I provide, as shown in FIGS. 7 and 8, an arrangement to position the burners so they can be brought close to the patties and to the buns, even though they may vary in thickness and even though the burner operation may vary.

While the subframes 66 and 67 may be changed in position, this requires considerable labor and I prefer to provide the superstructure 62 with a pair of opposite cross straps 106 carrying a rotatable cross-shaft 107. A squared end 108 on the shaft receives a suitable tool for turning the shaft. A pair of eccentrics 109 and 111 on the shaft engage the opposite walls of hollow blocks 112 and 113 supporting a subframe 114 on which a number of radiant burners 116, 117, 118 and 119 are mounted just above a conveyor run 121. The burners are supplied with gas through flexible hoses 122.

The precise spacing of the lower radiant surfaces of the burners from materials on the conveyor 121 can easily be regulated by properly turning the shaft 107. The patties can be precisely browned by suitably raising or lowering the burners.

A somewhat modified embodiment of the invention is shown in FIGS. 9, 10 and 11. There is the usual framework 126 on which is mounted a patty conveyor 127, in this instance having its upper run 128 traveling from left to right. The term "patty" is intended to refer also to other items of comparable nature, such as steak, that can travel on a conveyor like conveyor 127. The two patty conveyor runs operate quite close together in suitable guides. A quick demountable bearing arrangement 125 (FIG. 10) supports the conveyor shaft so the conveyor can easily be disassembled for cleaning. Beneath the patty conveyor on the framework 126 is a bun conveyor 129 of about the same length and construction. Both conveyors are driven by a motor 131 but the bun conveyor shaft 132 is driven at about twice the speed at which the patty conveyor shaft 133 is driven. This is appropriate as there are customarily two half-buns per patty.

The patty conveyor, as it advances from a loading station 134, first passes above a bottom battery of radiant burners 136 arranged to direct heat upwardly toward the closely spaced bars of both runs of the patty conveyor to heat then very hot. The result is that the patties are immediately seared upon contact with the hot conveyor bars and thus do not stick to the bars. The knife 51 of the FIG. 1 arrangement can, therefore, be omitted.

In this initial zone there are no radiant burners above the patty conveyor. It is important that the patties at first be cooked from below. This tends to seal the nether surfaces of the patty and tends to keep juice and melted fat within the patty itself. There is thus no drip or only an inconsequential drip and shields over the lower burners can be omitted.

As the patties progress they finally come under a series of top radiant burners 137. Since the cooking from above is preferably longer than from below there are more top burners in the series. Actually, as shown in FIG. 10, the top series 137 overlaps the bottom series 136 somewhat as in practice it is found satisfactory and timesaving to start cooking from the top before cooking from the bottom has been entirely finished.

The top cooking does tend to discharge some juices and fats from the patty so that on the frame 126 beneath most of the burners of the top series there is positioned a grease deflector 138. This includes two inclined side plates 139 and 141 curled at the bottom to form troughs leading through drain ducts 142 to a removable grease reservoir 143. The side plates 139 and 141 do not meet at the top but rather are spaced apart to provide a vent opening 144 protected by a ridge cap 146. With this construction, although liquids are intercepted and drain to the grease reservoir, there is a generous path for warmed air to rise to the cooking materials and to the burners and then to discharge through a top vent (not shown) at the upper portion of the machine. This ventilation affords sufficient air for cooking and for burner combustion so that the upper portion of the framework can be substantially closed and insulated on both sides, if desired.

Situated just below the series of burners 136 are burners 147 arranged to brown or warm buns advancing on the conveyor 129. The buns are warmed or toasted by only two burners near the beginning of their conveyor and are kept warm by the generally warm interior of the machine.

Both the buns and the patties discharge at about the same time. The buns are transferred to an exposed conveyor 148 while the patties, if not previously lifted of by an attendant, fall freely into a receiving basket 149 comprised of spaced bars and dispose above a drip pan 151 having a drain tube 152 discharging into the trough of the side plate 141.

To supply the gas and electricity, an arrangement as shown in FIG. 11 is used. Gas from the usual source is available through a pipe 156 having a main shut-off valve 157, a pressure regulator 158, and an electrically controlled solenoid valve 159. When the valve 159 is closed, gas goes no further but when the valve 159 is open, gas flows through a pipe 161 to a branch 162. One line 163 continues from the branch and serves as a first manifold, having flexible tubes 164 extending to alternate ones of the burner series 136 and 137. Another line 166 extends from the branch 162 through a shut-off valve 167 and serves as a manifold by connecting through flexible tubes 168 to the intermediate burners of the series 136 and 137. When the valve 167 is open all burners are supplied and the capacity is maximum, while when the valve 167 is closed only some of the burners are supplied and the capacity is reduced.

From the pipe 156 there is a pilot pipe 171 having a shutoff valve 172 and a solenoid controlled valve 173 in series therein. When pressed open by the operator an ignitor press valve 174 permits flow of gas into an ignitor tube 176 leading to an ignitor tube 177 for the burners 147, to an ignitor tube 178 for the burners 136 and to an ignitor tube 179 for the burners 137.

I claim:

1. A hamburger cooking machine comprising a frame, a plurality of cooking elements said frame each having a heat radiating surface, an openwork chain patty conveyor, means for mounting said patty conveyor on said frame to provide an upper run of said conveyor in a position relative to at least one of said radiating surfaces to cook a patty thereon and to provide a lower run of said conveyor directly adjacent another of said radiating surfaces, whereby material adhering to said conveyor lower run will be carbonized and fall by gravity, and means on said frame for driving said conveyor.

2. A hamburger cooking machine as in claim 1 including means on said frame below said cooking element for catching grease and the like falling from said conveyor.

3. A hamburger cooking machine as in claim 1 including means on said frame and overlying said upper run in the path of a hamburger patty advancing thereon for lifting said hamburger patty from said conveyor.

4. A hamburger cooking machine as in claim 1 wherein said cooking elements on said frame are arranged with said heat radiating surfaces thereof above and below said upper run and said lower run and exposed thereto.

5. A hamburger cooking machine as in claim 1 including an openwork chain bun conveyor, means for mounting said bun conveyor on said frame parallel to said patty conveyor, and means on said frame for driving said bun conveyor in the same direction as and within the zone warmed by the cooking elements of said patty conveyor.

6. A hamburger cooking machine as in claim 5 including means for subjecting said bun conveyor to radiant heat.

7. A hamburger cooking machine as in claim 1 in which means are provided on said frame for at least partially enclosing a portion of said patty conveyor between the ends thereof.

8. A hamburger cooking machine as in the claim 1 including means between said frame and said cooking element for varying the distance between said cooking element and said patty conveyor.

9. A hamburger cooking machine as in claim 1 in which said cooking element is a gas-fired surface combustion burner.

10. A hamburger cooking machine as in claim 1 in which said patty conveyor is subjected to heat from a plurality of cooking elements arranged initially to cook patties on said conveyor from below and finally to cook said patties from above.